IMPROVED DUAL CHANNEL AMPLIFIER SYSTEM

Filed July 5, 1960 2 Sheets-Sheet 1

INVENTOR.
HARRISON E. DOW
BY
Robert D. Sanborn
ATTORNEY

IMPROVED DUAL CHANNEL AMPLIFIER SYSTEM

Filed July 5, 1960 2 Sheets-Sheet 2

INVENTOR.
HARRISON E. DOW

BY
Robert D. Sanborn
ATTORNEY 3,094,587

IMPROVED DUAL CHANNEL AMPLIFIER SYSTEM

Harrison E. Dow, Wycombe, Pa., assignor, by mesne assignments, to Philco Corporation, Philadelphia, Pa., a corporation of Delaware Filed July 5, 1960, Ser. No. 40,815
15 Claims. (Cl. 179—1)

The present invention relates to audio amplifier systems and more particularly to dual channel amplifier systems for the reproduction of stereophonically related program signals or the like.

It is well known that in most musical passages a large fraction of the total audio power lies in the bass frequency components of the signal—that is, components having frequencies in the frequency range up to approximately 300–500 cycles per second. It has been discovered also that these bass frequencies contribute very little to the overall stereophonic separation effect. Since the bass frequency reproducer i.e. speaker and enclosure of an audio system, is usually relatively large, it has been proposed to employ in dual channel stereophonic audio reproducers only a single bass range speaker system but separate mid-range speaker systems. This is usually accomplished by providing a crossover network or the equivalent in the output of the two channels of the stereophonic system, supplying the low frequency outputs of the two crossover networks to a linear signal adder network and then coupling the output of the adder network to the input of the common bass range speaker system. While this arrangement can result in a substantial reduction in the overall size of the audio system by eliminating one of the two large bass frequency reproducers it does nothing to relieve a second problem which is usually present in dual channel reproducers, namely, that it is usually uneconomical to construct the amplifiers in the two channels so that each is individually capable of supplying the total power required to reproduce properly the bass frequency components of the two stereophonically related signals. If a bass frequency signal is supplied equally to the two inputs of the dual channel system, the amplifiers in the two channels are effectively operating in parallel to amplify the bass frequency components. Therefore the total undistorted power available in the bass frequency range is equal to the sum of the power outputs of the two amplifiers. However in many recordings the amplitudes of the bass frequency components in one channel may be several times that of the bass frequency components in the other channel. In this case the power supplied to the single bass frequency reproducer is supplied almost entirely by only one of the two channels. If the amplifiers are operated at or near their maximum power handling capacity with balanced bass frequency signals, the unbalancing of the signals in the bass frequency range reduces the total undistorted power available to approximately one-half that available for balanced bass frequency signls. This will produce a notable loss in audio power in the bass frequency range and/or an increase in the distortion level.

In certain audio amplifier systems, negative feedback is provided from the speaker terminals to an earlier point in the amplifier circuit to improve the linearity of the amplifier system. In amplifiers which derive the feedback signal from the combined bass frequency range signals of the two channels, evan a relatively small unbalance in the amplitudes of the bass frequency components of the signals in the two channels will cause the amplitude of the signals in both channels to increase rapidly to the point where overloading of one or both the amplifiers is likely to result. This too will bring about a loss in available bass range power and an increase in the amount of distortion present.

Therefore, it is an object of the present invention to provide a dual channel amplifier system which makes full use of the power handling capabilities of both channels for all signals in the bass frequency range.

Another object of the present invention is to provide a dual channel amplifier system having a single bass frequency range speaker system which is relatively free of distortions on unbalanced input signals.

Still another object of the present invention is to provide a dual channel, negative feedback stabilized, amplifier system which is relatively insensitive to unbalancing of the input signals to the two channels.

I have discovered that these and other objects of the present invention may be achieved, and the operation of dual channel amplifier systems greatly improved, by cross-coupling the two channels for low frequency signals at a point prior to the final stage of each channel in addition to coupling the low frequency output signal components of the two channels to a single bass frequency reproducer. The cross-coupling of the inputs of the two channels is achieved by supplying to the inputs of the amplifier in each channel a bass frequency signal derived from an appropriate point in the opposite channel. This cross-feeding of signals to the inputs of the two amplifier channels tends to equalize the amplitudes of the bass frequency components present in the two channels.

For a better understanding of the present invention together with other and further objects thereof reference should now be made to the following detailed description which is to be read in conjunction with the accompanying drawings in which.

Figure 1:
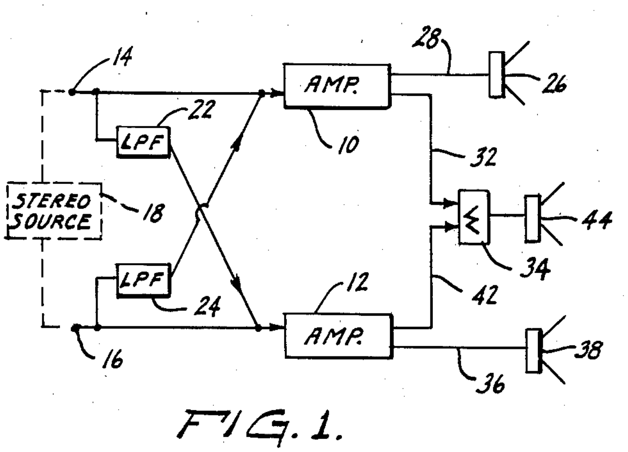
FIG. 1 is a block diagram of one preferred embodiment of the present invention.

The system shown in block form in FIG. 1 illustrates the basic principles of the present invention. This system embodies two amplifier channels 10 and 12. Each channel may include one or more amplifier stages. The signal input connections to amplifier channels 10 and 12 are represented by input leads 14 and 16, respectively. A stereophonic source 18 is shown connected to these two leads. Source 18 is shown in broken lines since it does not form a part of the invention per se. The source 18 may be the output of a stereophonic tuner or the stereophonic transducer of a tape or disc reproducer. The source 18 may include, in addition, preamplifier stages, volume controls, tone controls and the like.

The two input leads 14 and 16 are cross-connected by low pass filters 22 and 24. Preferably filters 22 and 24 pass only those bass frequency components which contribute little to the stereophonic separation effect. For example, they may have an upper cutoff frequency in the range of 300 to 500 cycles.

Figure 1A:
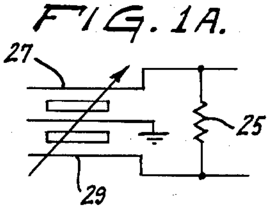
FIG. 1A is a diagrammatic representation of one form of cross-coupling circuit which may be employed in FIG. 1.

One economical form of cross-coupling circuit of the type required in FIG. 1 is shown in FIG. 1A. A resistor 25 is coupled between the ungrounded terminals of a crystal stereophonic phonograph transducer. The resistor 25 together with the capacitance of one crystal of the transducer functions as a low pass filter corresponding to filter 22 of FIG. 1. The resistor 25 and the capacitance of the other crystal function as a low pass filter corresponding to filter 24 of FIG. 1.

Amplifier 10 includes suitable circuits for supplying the mid-frequency and high frequency components of the output signal to a speaker 26 by way of connection 28. The low frequency components of the signals amplified by channel 10 are supplied by way of connection 32 to one input of adder circuit 34. The separation of the high frequency and low frequency components may be achieved by a conventional crossover network in the output circuit of amplifier channel 10. Similarly, amplifier channel 12 supplies the high frequency components of the program signal amplified therein to a high and mid-range speaker 38 by way of output connection 36 and the low frequency components to a second input of adder 34 by way of connection 42. The output of adder 34 is supplied to a third speaker 44.

The operation of the system is as follows. Stereophonically related signals from source 18 are supplied to the inputs 14 and 16 of amplifiers 10 and 12. A portion of the low frequency component of the signals supplied to input 16 is supplied to the input of amplifier 10 by way of low pass filter 24. Similarly, a portion of the low frequency component of the signal supplied to terminal 14 is supplied to the input of amplifier 12 by way of low pass filter 22. The signal transfer characteristics of filters 22 and 24 are preferably chosen so that, at frequencies below the selected upper limit of the bass frequency signals, the net amplitudes of the bass frequency components supplied to amplifier channels 10 and 12 are nearly equal regardless of the degree of unbalance of the bass frequency components supplied by source 18. In the circuit of FIG. 1A this can be accomplished by making the impedance of resistor 25 equal in magnitude to the capacitive impedance of one of the crystals of the phono-transducer at a selected frequency in the bass frequency range. In certain cross-coupling arrangements the signals supplied by way of filters 22 and 24 may tend to increase the amplitude of the net bass signal components supplied to the inputs of the two channels 10 and 12. This increase in amplitude is unobjectionable for, as will be explained presently, the low frequency components are supplied to a separate speaker. Therefore the level of the bass frequency components may be controlled independently of the mid-frequency and high frequency components in the coupling network to the separate speaker.

Since the effect of the filters 22 and 24 is to equalize the amplitudes of the bass frequency components supplied to channels 10 and 12, these two channels, in effect, operate in parallel for all bass frequency signals regardless of an unbalance in the bass frequency signals supplied to inputs 14 and 16 by source 18. As a result, the entire combined power handling capacity of amplifier channels 10 and 12 is available for amplifying the bass frequency components even though source 18 supplies a signal to only one of these channels.

The bass frequency components of the signals supplied by the two channels 10 and 12 are combined by adder 34 and supplied to speaker 44. Adder 34 may be either an active or a passive adder network. For example, it may be an active adder network which includes two amplifier stages having separate inputs but a common load impedance or it may be a passive network which comprises a transformer having two primary windings and a single secondary winding.

Preferably the upper frequency limit of the signals supplied by way of connections 32 and 42 corresponds closely to the upper cutoff frequency of filters 22 and 24 at the input of amplifiers 10 and 12. However there need not be an exact correspondence.

As mentioned above, the mid-frequency and high frequency components of the signal at the output of amplifiers 10 and 12 are supplied to speakers 26 and 38. These speakers may be appropriately placed in the room to give the desired stereophonic effect to the total audio signal produced by the system. Speaker 44 may be placed midway between the speakers 26 and 38.

Figure 2:
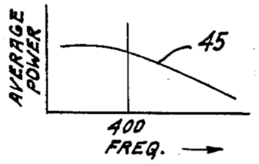
FIG. 2 is a plot of average signal power versus frequency range for a typical signal to be reproduced.

The amplification of the mid-frequency and high frequency components of the signals supplied by source 18 is not materially affected either by the cross-connection of the inputs or the cross-connection of the outputs of the two amplifier channels. As shown in FIG. 2 the average power level of typical musical passages represented by curve 45 falls off quite rapidly above about 400 cycles. Also, speakers together with their enclosures are generally more efficient in converting electrical energy to acoustical energy at higher frequencies than they are at low bass frequencies. Therefore each of the channels 10 and 12 will be able to handle the entire mid-range or high range signal, if necessary, without overloading. Speech signals tend to have a power peak at a frequency above 1000 cycles but the average power level of speech is usually so far below that of typical musical selections that there is little danger of the amplifier channels 10 and 12 overloading due to speech frequency components.

Figure 3:
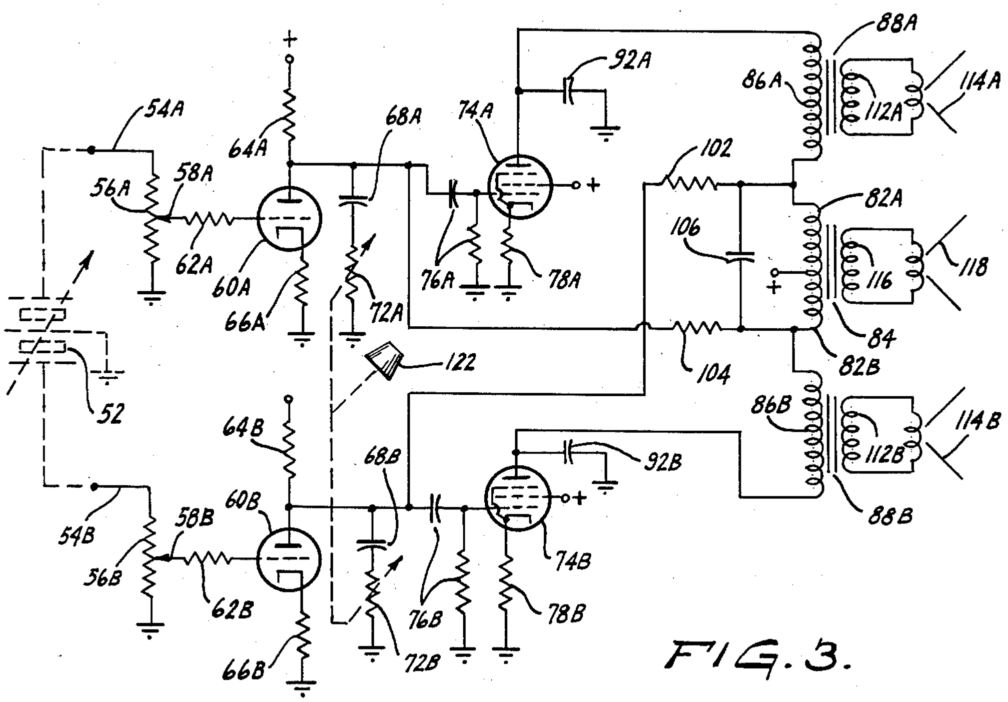
FIG. 3 is a schematic drawing of a preferred embodiment of the present invention which derives its cross-feed from the output of each amplifier channel.

In FIG. 1 the signal supplied from the first channel to the input of the second channel is derived from the input of the first channel. However it is to be understood that this signal may be derived from any appropriate point in the first channel. FIG. 3 illustrates a preferred embodiment of the invention in which the signal supplied to the input of each channel is derived from the output of the opposite channel. In FIG. 3 the source of stereophonic signals is again represented in broken lines at 52. The source 52, illustrated in FIG. 3, is a stereophonic phonograph transducer similar to the transducer shown in FIG. 1A except that no cross-coupling resistor 25 is employed. One output of source 52 is connected to the ungrounded side 54A of a volume control potentiometer 56A. The tap of 58A on potentiometer 56A is coupled to the control grid of a first amplifier tube 60A by way of an isolating resistor 62A. Tube 60A is provided with the usual anode load resistor 64A. It is also provided with an unbypassed cathode resistor 66A. Cathode load resistor 66A provides a form of negative feedback which tends to stabilize the operation of the amplifier. A capacitor 68A and a variable resistor 72A are connected in series between ground and the anode of tube 60A. Resistor 72A and capacitor 68A together form a tone control circuit which provides an adjustable rolloff characteristic at high frequencies.

The anode of tube 60A is coupled to the grid of a pentode power amplifier tube 74A by way of resistor capacitor coupling network 76A. Again tube 74A is provided with an unbypassed cathode resistor 78A which provides a form of negative feedback or degeneration which stabilizes the operation of the amplifier stage. The use of unbypassed cathode resistors is optional and is shown by way of illustration only. The anode load impedance for tube 74A comprises one primary winding 82A of a transformer 84 and the single primary winding 86A of a second transformer 88A. The anode of tube 74A is bypassed to ground by a relatively small capacitor 92A. Capacitor 92A is a tone control capacitor which reduces the gain of the power amplifier stage for high frequencies.

The signal supplied by the second output of source 52 is amplified in a second channel which is identical to the one just described. Therefore the various components of the second channel have been given the same reference numeral as the corresponding part in the channel just described except that the reference numeral is followed by the letter "B" rather than the letter "A." The anode supply source for tube 74A is connected to the common terminals of primary windings 82A and 82B of transformer 84. The sources of anode bias potential for tubes 74A, 76A, 60A and 60B and the source of screen grid bias potential for tubes 74A and 74B are shown schematically in FIG. 1 by the plus signs adjacent the appropriate terminals.

The junction of windings 82A and 86A is coupled to the grid of power amplifier tube 76B through an isolating resistor 102. Preferably isolating resistor 102 has a value of several hundred thousand ohms. In general, it is somewhat larger than the resistor in coupling circuit 76B so that coupling circuit 76B and resistor 102 form a signal divider network which reduces the amplitude of the feedback signal to the input of tube 76B. Since the points coupled by resistor 102 are at approximately the same direct potential, no direct current blocking capacitor is required.

A similar resistor 104 connects the junction of secondary windings 82B and 86B to the control gird of 76A by way of coupling network 76A. It will be seen that the signal paths afforded by resistors 102 and 104 effectively cross-connect the inputs of the two power amplifier stages which include tubes 74A and 74B, respectively. Thus the stages which include tubes 74A and 74B correspond to the amplifier channels 10 and 12 of FIG. 1. The stages which include the tubes 60A and 60B act as preamplifier stages (not shown in FIG. 1) which are not cross-connected.

In many instances a sufficient increase in power handling capacity can be achieved by cross-coupling only the final or power amplifier stages. However the stages, including tubes 60A and 60B, may be included in the cross-coupled channels by coupling resistor 102 to the cathode of tube 60A and resistor 104 to the cathode of tube 60B by way of suitable blocking capacitors. Alternatively, the coupling may be to the grids of tubes 60A and 60B by way of suitable signal inverting networks. A system in which the cross-feed is to the grids of tubes 60A and 60B is shown in detail in FIG. 4. Secondary windings 82A and 82B are shunted by a capacitor 106. Capacitor 106 is selected so that there is substantially no signal frequency variation in the potential at the junction of secondary windings 82A and 86A and the junction between windings 82B and 86B at any frequency above the bass frequency range. Thus windings 82A and 82B and capacitor 106 together form a low pass filter between the outputs of tubes 74A and 74B and winding 116 on transformer 84.

The secondary winding 112A on transformer winding 88A is coupled to the mid-frequency and high frequency transducer 114A which serves one of the channels shown in FIG. 3. Transducer 114A is represented in FIG. 3 as a single speaker. However it is to be understood that multiple speakers or other forms of transducers may be employed. Transformer 88B supplies signals to the corresponding transducer 114B by way of a secondary winding 112B. Transformer windings 112A and 112B and reproducers 114A and 114B are so connected that signals supplied to inputs 54A and 54B in push-pull are supplied to reproducers 114A and 114B in phase. This can be achieved by making connections between secondary winding 112B and transducer 114B, for example, opposite to that of the connection from secondary winding 112A to transducer 114A.

Windings 82A and 82B supply to the single secondary winding 116 of transformer 84 a signal which is representative of the sum of the bass frequency components supplied by the two amplifier channels of FIG. 3. These common bass frequency signals are supplied to the bass frequency reproducer 118. Again reproducer 118 may be a single speaker or a suitable array of speakers.

The capacitor 106 shunts windings 82A and 82B at higher frequencies so that there is no appreciable signal developed across either of the windings 82A or 82B at frequencies above the bass range. Therefore there is no appreciable signal supplied to the common secondary winding 116 or to the bass frequency reproducer 118. Thus it will be seen that transformer windings 82A and 82B and capacitor 106 together form both a signal adder and a crossover network for the two channels.

The tone control resistors 72A and 72B are shown ganged to a single control 122. Individual controls are provided for volume control potentiometers 56A and 56B. This permits the amplitudes of the signals in speakers 114A and 114B to be adjusted individually to provide the desired balance between the stereophonically related output signals. However it lies within the scope of the invention to gang the controls for the movable arms 58A and 58B on the volume control potentiometers 56A and 56B. A clutch may be provided in the connection from the common control (not shown) to one of the taps 58A and 58B so that the taps may be moved either together to provide an overall change in volume or individually to improve the balance of the system.

Figure 4:
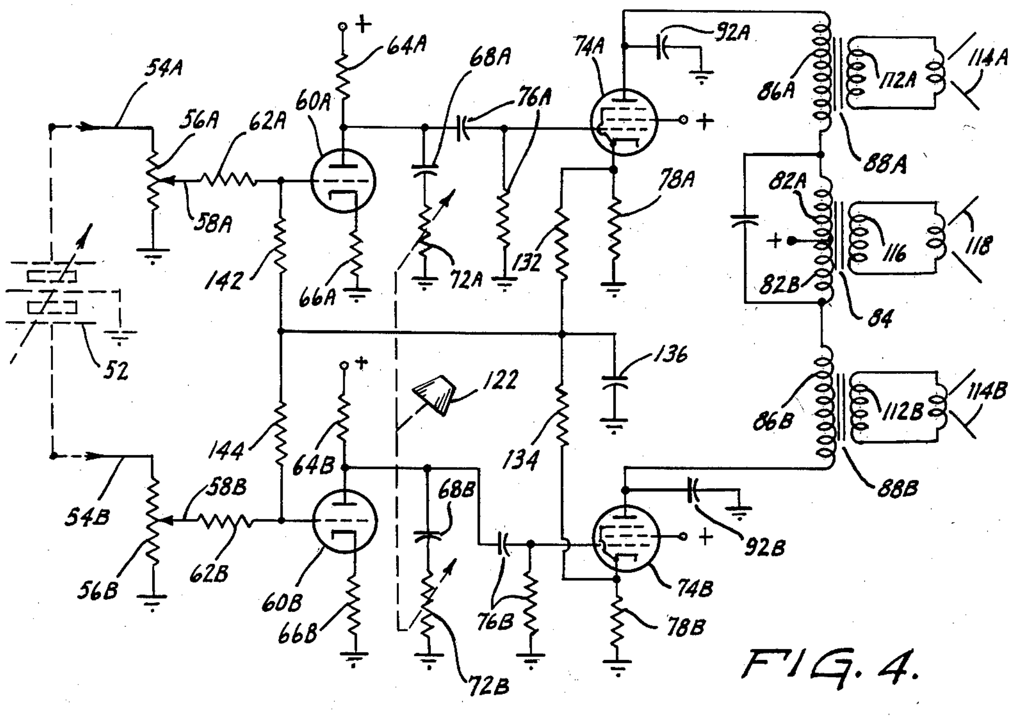
FIG. 4 is a further embodiment of the present invention in which the cross-feed between the two channels is provided by a difference signal and is fed back to the input of the two amplifier channels.

FIG. 4 illustrates an embodiment of an invention which is similar to the one shown in FIG. 3 except that the cross-feed between the inputs of the two amplifier channels is in the form of a difference signal taken from the cathodes of the power amplifier tubes 74A and 74B and fed back to the grids of the amplifier tubes 60A and 60B. Parts in FIG. 4 corresponding to like parts in FIG. 3 have been identified by the same reference numeral.

It will be seen that the feedback connection afforded by resistors 102 and 104 in FIG. 3 are omitted in FIG. 4. Instead, two equal resistors 132 and 134 are connected in series between the cathodes of power amplifier tube 74A and amplifier tube 74B. The common connection of resistors 132 and 134 is connected to ground through a capacitor 136. The common junction of resistors 132 and 134 is also coupled to the control grids of tubes 60A and 60B through isolating resistors 142 and 144, respectively.

The system of FIG. 4 operates as follows. The audio signal appearing across capacitor 136 in the bass frequency range will be equal to the difference between the two audio signals appearing at the outputs of tubes 74A and 74B. This is so because the signal appearing across the cathode resistors 78A and 78B will be proportional to the output signals from the tubes 74A and 74B. If the bass frequency signals supplied to the inputs 54A and 54B are equal, then no difference signal will appear across capacitor 136 and no signal will be coupled back to the grids of tubes 60A and 60B by way of resistors 142 and 144. However, if the bass frequency signal supplied to one of the inputs 54A or 54B is larger than the other, a net difference signal will appear across capacitor 136. This difference signal is coupled back to the grids 62A and 62B by way of resistors 142 and 144. The phase of this difference signal is such as to reduce the net amplitude of the larger signal supplied to the grids of tubes 60A and 60B and to increase the amplitude of the smaller signal. Ideally the constants of the feedback network are selected so that the amplitude of the net signals supplied to control grids 60A and 60B are nearly equal even though the amplitude of the bass frequency signal supplied to one of the inputs 54A and 54B from source 52 is many times the amplitude of the signal supplied to the other of these two inputs. It is not possible to obtain exact equality since a difference in the amplitudes of the signal supplied to grids of tubes 74A and 74B is necessary in order to develop the difference signal across capacitor 136.

It will be seen that the common terminal of resistors 132 and 134 is substantially at ground potential for signals above the bass frequency range. Therefore the difference signal cross-feed network just described is inoperative at frequencies above the selected bass frequency range. Since the common connection of resistors 142 and 144 is at ground potential for frequencies above the bass frequency range, there is no cross-coupling between the grid of tube 60A and the grid of tube 60B by way of resistors 142 and 144 at frequencies above bass frequency range.

Figure 4A:
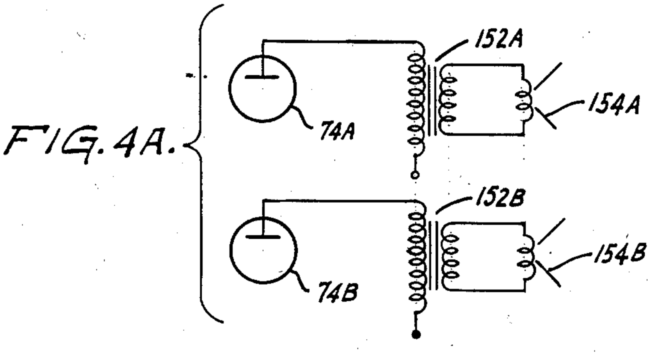
FIG. 4A is a partial schematic drawing showing a possible modification of the circuit of FIG. 4.

The difference frequency feedback connection shown in FIG. 4 may be applied also to stereophonic systems having two independent output systems as shown in the partial schematic of FIG. 4A. In FIG. 4A, tubes 74A and 74B correspond to the similarly numbered tubes in FIG. 4. These tubes are provided with separate output transformers 152A and 152B, respectively. The secondary of transformer 152A is coupled to an audio transducer system 154A. Transducer 154A is shown as a single speaker in FIG. 4A but it is to be understood that it may comprise multiple speaker arrangement with the necessary crossover networks commonly employed in high fidelity sound systems. Transformer 152B supplies a similar transducer 154B which is diagrammatically shown as a single speaker.

Figure 5:
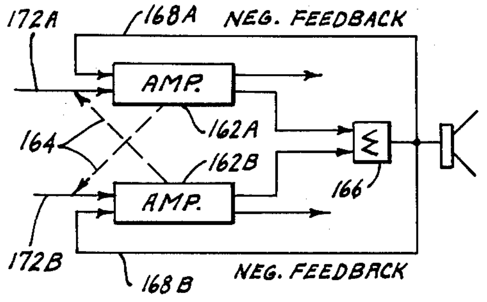
FIG. 5 is a partial block diagram of a dual channel amplifier system which includes negative feedback connections.

FIG. 5 illustrates two amplifier channels 162A and 162B in which the cross-coupling between the two amplifier channels is schematically represented by the broken lines 164. It is to be understood that this cross-coupling may be of the type shown in FIGS. 1, 3 or 4 of the present application. The bass frequency outputs of the amplifier channels 162A and 162B are supplied to a signal adder circuit 166. Negative feedback connections 168A and 168B are provided from the output connection of adder 166 to appropriate points in the amplifier channels 162A and 162B. For example, this negative feedback connection could be made to the grids of tubes 60A and 60B in FIGS. 3 and 4. It can be shown that if equal signals are supplied to the inputs of amplifier channels 162A and 162B, the negative feedback chanels from the common output of adder 16 to the individual amplifier channels 162A and 162B function substantially as individual feedback networks for the two channels. However, in the absence of any cross-feed to the inputs to the two channels, if the bass frequency signal is supplied to the input of one of the channels 162A and 162B and not to the other, the net signal level in both of the amplifiers 162A and 162B will increase greatly, possibly to the point where these amplifiers no longer operate in their linear range. This is so even though the combined outputs of the two channels do not increase. This may be explained as follows.

Let:

S represent the amplitude of the bass frequency components supplied to input 172A of amplifier channel 162A, T represent the amplitude of the bass frequency component supplied to input 172B of amplifier chanel 162B, $\frac{1}{\beta}$ the feedback factor of each of the two paths 168A and 168B, G the gain of each of the amplifier channels 162A and 162B without negative feedback, $e_1$ the net input signal supplied to the amplifier 162A, i.e. the difference between signal S and the feedback signal, $e_2$ the net input signal supplied to the amplifier 162B, and $E_o$ the amplitude of the signal at the output of adder 166.

Therefore, without cross-coupling between the channels, $$e_1 = S - \frac{E_o}{\beta} \tag{1}$$

$$e_2 = T - \frac{E_o}{\beta} \tag{2}$$

$$E_o = e_1 G + e_2 G \tag{3}$$

Substituting (1) and (2) in (3), it will be seen that $$E_o = (S+T)\frac{G}{1+\frac{2G}{\beta}} \tag{4}$$

Substituting (4) in (1) yields $$e_1 = \frac{S(\beta+G)-TG}{\beta+2G} \tag{5}$$

If $S=T$ equation (5) simplifies to $$e_1 = A\frac{\beta}{\beta+2G} \tag{6}$$

However, if $T=0$ then (5) becomes $$e_1 = S\frac{(\beta+G)}{\beta+2G} \tag{7}$$

Taking the ratio of (7) and (6) it will be seen that if one of the signals goes to zero, the signal in the other channel increases by a factor of $$1+\frac{G}{\beta}$$

The ratio of $$\frac{G}{\beta}$$

for a typical amplifier may be of the order of 3. Therefore, in a system of the type shown in FIG. 5 without the cross-coupling 164, removal of the bass frequency signal from one channel without changing the amplitude of the signal supplied to the other channel may increase the amplitude of the net input signal to the one channel by a factor of four. It can be shown that the amplitude of the net input signal in the channel which receives no bass signal from the source increases by a factor of $$\frac{G}{\beta}$$

due to the feedback signal alone. The signal from the second channel is out of phase with the signal in the first channel and subtracts from the signal supplied by the first channel. Thus, though the net output from the two channels may not increase, each channel must amplify signals several times larger than the maximum signals present if the input signals are balanced. This is usually sufficient to cause the amplifier channels to operate over non-linear portions of their characteristics. This will greatly increase the distortion present in the combined output signal and may produce a net decrease in the apparent signal level at bass frequencies.

The above-mentioned difficulty is avoided in the embodiment of the invention shown in FIG. 5 by the cross-coupling network shown diagrammatically at 164. Network 164 tends to equalize the net signals present on inputs 172A and 172B in the manner described in detail in connection with the description of FIGS. 1, 3 and 4. The connection of the outputs of the two channels of a stereophonic system to a single low frequency output transducer may so couple the two channels at low frequencies that the feedback connections at low frequencies may be effectively those shown in FIG. 5 even though, in practice, entirely separate feedback paths are employed. For example, feedback connections from the anodes of tubes 74A and 74B, respectively, to appropriate points in the respective channels affect only their associated channel at frequencies above the bass range but function in the manner described above at frequencies within the bass range to cause an unwanted increase in signal level in the two channels on unbalanced input signals.

While the invention has been described with reference to the preferred embodiments thereof, it will be apparent that various modifications and other embodiments thereof will occur to those skilled in the art within the scope of the invention. For example, transistor amplifier stages may be employed in place of the vacuum tube amplifier shown. Accordingly I desire the scope of my invention to be limited only by the appended claims.

I claim:

1. An audio amplifier system comprising first and second amplifier channels, each of said channels including at least one amplifier stage, means for supplying a signal from a first source to the input of said first amplifier channel, means for supplying a signal from a second source to the input of said second amplifier channel, a common low frequency output transducer, means coupling the outputs of said first and second amplifier channels to said common transducer for low frequency signals, low-pass signal coupling means having input terminals connected to said first and second amplifier channels respectively, and output terminals connected, respectively, to the input of said first amplifier channel and the input of said second amplifier channel, said low-pass signal coupling means being constructed and arranged to cross-couple low frequency signals only from each channel to the input of the other channel thereby to tend to equalize the amplitudes of the low frequency signals present in said two amplifier channels.

2. An audio amplifier system comprising first and second amplifier channels, each of said amplifier channels including at least one amplifier stage, means for supplying a signal from a first source to the input of said first amplifier channel, means for supplying a signal from a second source to the input of said second amplifier channel, a common low frequency output transducer, means coupling the outputs of said first and second amplifier channels to said common transducer for low frequency signals, low-pass signal coupling means for coupling selected low frequency signals from a point in said first amplifier channel to the input of said second channel, and low-pass signal coupling means for coupling selected low frequency signals from a point in said second amplifier channel to the input of said first channel, thereby to tend to equalize the amplitudes of the low frequency signals present in said two amplifier channels.

3. An audio amplifier system comprising first and second amplifier channels, each of said amplifier channels including at least one amplifier stage, means for coupling a signal from a first source to the input of said first amplifier channel, means for coupling a signal from a second source to the input of said second amplifier channel, a common low frequency output transducer, means coupling the outputs of said first and second amplifier channels to said common transducer for low frequency signals, low-pass signal coupling means coupling the output of said first amplifier channel to the input of said second amplifier channel, and low-pass signal coupling means coupling the output of said second amplifier channel to the input of said first amplifier channel, said two last-mentioned coupling means being adapted to couple selected low frequency signals from the outputs of said first and second amplifier channels to the inputs of said second and first amplifier channels, respectively, the phases of the signals provided by said two last-mentioned coupling means being such as to tend to equalize the amplitudes to the low frequency signals present in the two amplifier channels.

4. An audio amplifier system comprising first and second amplifier channels, each of said amplifier channels including at least one amplifier stage, means for supplying a signal from a first source to the input of said first amplifier channel, means for supplying a signal from a second source to the input of said second amplifier channel, a common low frequency output transducer, means coupling the outputs of said first and second amplifier channels to said common transducer for low frequency signals, signal combining means coupled to the outputs of said first and second amplifier channels for providing a signal having an instantaneous amplitude proportional to the instantaneous difference in amplitude of the low frequency components of the output signals of said first and second amplifier channels, and means coupling the output of said signal combining means to the inputs of said first and second amplifier channels, said last-mentioned coupling means supplying said difference signal to the input of said first and second amplifier channels in a phase tending to equalize the low frequency signals present in said two amplifier channels.

5. An audio amplifier system comprising first and second amplifier stages, each of said amplifier stages including an input and an anode load impedance, means for supplying a signal from a first source to said input of said first amplifier stage, means for supplying a signal from a second source to said input of said second amplifier stage, said anode load impedance of said first stage comprising one primary winding of a first transformer and the primary winding of a second transformer connected in series, said anode load impedance of said second stage comprising a second primary winding of said first transformer and the primary winding of a third transformer connected in series, means coupling the common junction of said first primary winding of said first transformer and said primary winding of said second transformer to the input of said second stage, means coupling the junction of said second primary winding of said first transformer and said primary winding of said third transformer to the input of said first stage, said first transformer further comprising a secondary winding coupled jointly to said first and second primary windings, first, second and third output transducers, means coupling said secondary winding of said first transformer to said first output transducer, said second and third transformers each further comprising a secondary winding, means coupling said secondary winding of said second transformer to said second output transducer, means coupling said secondary winding of said third transformer to said third output transducer and capacitor means coupling said common junction of said first primary winding of said first transformer and said primary winding of said second transformer to said junction of said second primary winding of said first transformer and said primary winding of said third transformer.

6. An audio amplifier system comprising first and second amplifier channels, each of said amplifier channels including at least one amplifier stage, means for supplying a signal from a first source to the input of said first amplifier channel, means for supplying a signal from a second source to the input of said second amplifier channel, a common low frequency output transducer, means coupling the output of said first and second amplifier channels to said common transducer for low frequency signals, low-pass signal coupling means having one input terminal connected to a point in said first amplifier channel separated from the input of said first amplifier channel by at least one amplifier stage and a second terminal connected to a point in said second amplifier channel separated from the input of said second amplifier channel by at least one amplifier stage and output terminals connected, respectively, to the input of said first amplifier channel and the input of said second amplifier channel, said low-pass signal coupling means being constructed and arranged to cross-couple low-frequency signals only from each channel to the input of the other channel thereby to tend to equalize the amplitude of the low frequency signals present in said two amplifier channels.

7. An audio amplifier system as in claim 6 wherein said connection from said point in said first amplifier channel to the input of said second amplifier channel is substantially independent of said connection from said point in said second amplifier channels to said input of said first amplifier channel.

8. An audio amplifier system as in claim 6 wherein said low-pass coupling means comprises a first feedback resistor connected from said point in said first amplifier channel to said input of said second amplifier channel and a second feedback resistor connected from said point in said second amplifier channel to said input of said first amplifier channel.

9. An audio amplifier system comprising first and second substantially identical amplifier channels, each of said channels including at least one amplifier stage, means for supplying a first signal to the input of said first amplifier channel, means for supplying a second signal to the input of said second amplifier channel, a common low-frequency output transducer, means coupling the outputs of said first and second amplifier channels to said common transducer for low frequency signals, a purely resistive network connecting a terminal of one stage of one amplifier channel at which the signal amplified by said one channel appears to the corresponding terminal in the other amplifier channel, a capacitor connected between an intermediate point of said resistive network and a point of reference potential, said resistive network and said capacitor acting as a low-pass coupling means which tends to equalize the amplitudes of the low frequency signals present in the output of said two amplifier channels.

10. An audio amplifier system comprising first and second substantially identical amplifier channels, each of said channels including at least one amplifier stage, means for supplying a signal from a first source to the input of said first amplifier channel, means for supplying a signal from a second source to the input of said second amplifier channel, the output circuit of said first channel comprising a first load impedance and a second load impedance connected in series, the output circuit of said second channel comprising a third load impedance and a fourth load impedance connected in series, one terminal of said second load impedance being connected to one terminal of said third load impedance, a first output transducer coupled across said first load impedance, a second output transducer coupled across said fourth load impedance, and a common low frequency output transducer coupled across said second and third load impedances, means for connecting the common terminal of said second load impedance and said third load impedance to a source of bias potential, a capacitor connected between the common junction of said first load impedance and said second load impedance and the common junction of said third load impedance and said fourth load impedance, and low-pass signal coupling means having one input terminal connected to a point in said first amplifier channel separated from the input of said first channel by at least one amplifier stage and a second input terminal connected to a point in said second amplifier channel separated from said input of said first amplifier channel by at least one amplifier stage and output terminals connected, respectively, to the input of said first amplifier channel and the input of said second amplifier channel, said low-pass signal coupling means being constructed and arranged to cross-couple low frequency signals from each channel to the input of the other channel thereby to tend to equalize the amplitude of the low frequency signal present in said two amplifier channels.

11. An audio amplifier system in accordance with claim 10 wherein said low-pass signal coupling means comprises together with said capacitor a first resistor connected between said junction of said first and second load impedances and the input of said second channel and a second resistor connected between said junction of said third and fourth load impedances and said input of said first amplifier channel.

12. An audio amplifier system in accordance with claim 10 wherein said low-pass signal coupling means comprises a purely resistive network connecting a point in said first amplifier channel other than signal ground to the corresponding point in said second amplifier channel, a capacitor connected between an intermediate point of said resistive network and a point of reference potential, and means coupling said intermediate point of said resistive network to the input of said first amplifier channel and the input of said second amplifier channel, respectively.

13. An audio amplifier system comprising first and second amplifier channels, each of said amplifier channels including at least one amplifier stage, means for supplying a signal from a first source to the input of said first amplifier channel, means for supplying a signal from a second source to the input of said second amplifier channel, low pass signal coupling means for coupling selected low frequency signals from a point in said first amplifier channel to the input of said second channel, and low pass signal coupling means for coupling selected low frequency signals from a point in said second amplifier channel to the input of said first channel, thereby to equalize the amplitude of the low frequency signals present in said two amplifier channels.

14. An audio amplifier system comprising first and second amplifier channels, each of said amplifier channels including at least one amplifier stage, means for coupling a signal from a first source to the input of said first amplifier channel, means for coupling a signal from a second source to the input of said second amplifier channel, low pass signal coupling means coupling the output of said first amplifier channel to the input of said second amplifier channel, and low pass signal coupling means coupling the output of said second amplifier channel to the input of said first amplifier channel, the phases of the signals provided by said two last-mentioned coupling means being such as to tend to equalize the amplitudes of the low frequency signals present in the two amplifier channels.

15. An audio amplifier system comprising first and second amplifier channels, each of said amplifier channels including at least one amplifier stage, means for supplying a signal from a first source to the input of said first amplifier channel, means for supplying a signal from a second source to the input of said second amplifier channel, low pass signal coupling means having one input terminal connected to a point in said first amplifier channel which is separated from the input of said first amplifier channel by at least one amplifier stage, and a second terminal connected to a point in said second amplifier channel which is separated from the input of said second amplifier channel by at least one amplifier stage and output terminals connected, respectively, to the input of said first amplifier channel and the input of said second amplifier channel, said low-pass signal coupling means being constructed and arranged to cross-couple low-frequency signals only from each channel to the input of the other channel thereby to tend to equalize the amplitude of the low frequency signals present in said two amplifier channels.

References Cited in the file of this patent

UNITED STATES PATENTS

| | | |
|---|---|---|
| 2,520,798 | De Boer | Aug. 29, 1950 |
| 2,698,379 | Boelens | Dec. 28, 1954 |
| 2,819,342 | Becker | Jan. 7, 1958 |
| 2,852,604 | MacCutcheon | Sept. 16, 1958 |
| 3,016,424 | Franke | Jan. 9, 1962 |